US006317583B1

(12) United States Patent
Wolcott et al.

(10) Patent No.: US 6,317,583 B1
(45) Date of Patent: *Nov. 13, 2001

(54) TELECOMMUNICATIONS SATELLITE CHANNELIZER

(75) Inventors: James L. Wolcott, La Mirada; Alan E. Faris, Los Angeles, both of CA (US)

(73) Assignee: TRW Inc., Redondo Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/900,495

(22) Filed: Jul. 25, 1997

(51) Int. Cl.[7] .......................... H04B 7/185; H04B 7/204; H04Q 7/20

(52) U.S. Cl. ................... 455/12.1; 455/428; 455/13.3; 370/318; 370/319

(58) Field of Search ............................ 455/12.1, 13.1, 455/13.2, 13.3, 427, 428; 370/316, 319, 325, 360; 342/352, 353

(56) References Cited

U.S. PATENT DOCUMENTS

| | | | |
|---|---|---|---|
| 3,678,387 | * | 7/1972 | Wilson .............................. 455/13.1 |
| 4,848,060 | * | 7/1989 | Dent .................................. 455/12.1 |
| 4,858,225 | * | 8/1989 | deSantis ............................ 370/323 |
| 5,428,814 | * | 6/1995 | Mort et al. ....................... 455/12.1 |
| 5,552,920 | * | 9/1996 | Glynn ................................ 455/13.3 |
| 5,652,750 | * | 7/1997 | Dent et al. ....................... 370/326 |
| 5,790,529 | * | 8/1998 | Haber ............................... 370/536 |
| 5,864,579 | * | 1/1999 | Briskman ......................... 455/13.1 |
| 5,878,330 | * | 3/1999 | Naumann ......................... 455/13.2 |

FOREIGN PATENT DOCUMENTS

0844752 * 5/1998 (EP) .

OTHER PUBLICATIONS

Tomasi, "Advanced Electronic Communications Systems" (c) 1987, Prentice–Hall, 1987.*
Couch, "Digital and Analog Communication Systems" (c) 1990 McMillan Publishing Co., 1990.*

* cited by examiner

Primary Examiner—Vivian Chang
Assistant Examiner—Charles N. Appiah
(74) Attorney, Agent, or Firm—McAndrews, Held & Malloy, Ltd.

(57) ABSTRACT

A telecommunications satellite channelizer (170) is provided for mapping RF signals between feeder links (160–162) and mobile link beams (210–212) based on a predefined frequency plan (FIGS. 7 and 8). The mobile link beams (240) define a coverage area (242) of a satellite (10). Each feeder link and mobile link beam comprises a plurality of feeder subbands and mobile subbands grouped to form feeder link channels (216–238) and mobile link channels (244–255). The channelizer (170) includes at least one feeder lead carrying a feeder link signal (160–162) associated with a ground station (14 and 16). A feeder link distribution network (175) is connected to the feeder leads and maps RF signals in the feeder links (160–162) onto a plurality of distribution leads as divided feeder signals. Channel multiplexers (182–184) are connected to the distribution leads. Each channel multiplexer (182) includes a set of band pass filters (190–201), each of which passes RF signals in a subset of feeder subbands corresponding to a single feeder channel in order to map a mobile link channel (244) and a feeder link channel (216) onto one another based on a predefined frequency plan. The channelizer (170) groups or multiplexes signals from a plurality of feeders into each beam. Fixed local oscillator up converters shift each composite mobile channel to a common band allocated to all beams. The frequency plan is defined such that beam handovers and ground station handovers may be performed without a need for at least one of switching, retuning and resynchronization of the telecommunications satellite and the mobile terminal.

33 Claims, 11 Drawing Sheets

TELECOMMUNICATIONS SATELLITE CHANNELIZER

CROSS-REFERENCE TO RELATED APPLICATIONS

The preferred embodiment of the present invention generally relates to co-pending application Ser. No. 08/629,860, filed Apr. 9, 1996, application Ser. No. 08/636,366 filed Apr. 23, 1996, and application Ser. No. 08/741,244, entitled "Orthogonal Code Division Multiple Access Waveform Format For Use In Satellite Based Cellular Telecommunications," filed Oct. 30, 1996, now U.S. Pat. No. 6,222,828 by John Ohlson and Donald Martin. The above referenced co-pending applications are incorporated in their entireties by reference.

STATEMENT REGARDING FEDERALLY SPONSORED RESEARCH OR DEVELOPMENT

Not applicable

BACKGROUND OF THE INVENTION

The present invention generally relates to the field of satellite based telecommunications and more specifically to a satellite channelizer subsystem for relaying communications signals between earth stations and mobile terminals based on predefined frequency plans.

Satellite based telecommunications systems have been proposed in the past in which a constellation of satellites orbit the earth while relaying bi-directional communications signals between mobile terminals and earth stations. In addition to supporting communication links between mobile terminals, these systems can connect mobile terminals to standard telephone subscribers, through earth station connections to public switched telephone networks.

By way of example only, FIG. 1 generally illustrates a subsection of a proposed system in which a satellite 10 relays radio frequency (RF) signals between mobile terminals 12 and 13 and earth stations 14 and 16. Communications links between mobile terminals 12 and 13 and satellite 10 are generally illustrated by references 18 and 19, while first and second feeder links between the satellite 10 and the first and second earth stations 14 and 16 are generally illustrated by references 20 and 22, respectively. Earth stations connect mobile terminals to fixed subscribers (not shown) via public switched telephone networks. Separate wideband terrestrial networks 11, 17 and 21 (e.g., fiberoptic cable, microwave links, etc.) carry user communications traffic and signaling information between earth stations.

The earth or ground stations 14 and 16 each transmit RF signals over forward links, via the satellite 10, to the mobile terminals 12 and 14. The mobile terminals 12 and 14, in turn, transmit RF signals over return links to the earth stations 14 and 16.

Each satellite 10 includes at least one mobile antenna array (not shown) which defines a mobile coverage area 24 upon the earth surface, and at least one feeder link antenna or array (not shown) which can be pointed independently of the mobile antenna array. Feeder links may be operated at frequencies other than those assigned to the mobile links. The satellite 10 transmits and receives RF signals to and from mobile terminals and earth stations within the coverage area 24. The mobile antenna array divides the coverage area into multiple adjacent mobile link beams 26. Each beam 26 contains multiple frequency subbands having staggered central frequencies. In a single beam, contiguous groups of subbands may be combined to form mobile link channels.

The satellite 10 receives and transmits RF communications signals to and from mobile terminal 12 over one of the mobile link frequency subbands associated with the beam in which the mobile terminal 12 is located. Each mobile link subband may simultaneously carry RF signals to and from multiple mobile terminals at a common center frequency through the use of code division multiple access (CDMA) techniques. Each mobile terminal is assigned a unique CDMA chip code which is embedded within RF signals transmitted to and from the mobile terminal 12. A mobile terminal to satellite bi-directional communications link (having forward and return links) established over a predefined mobile link subband and having a predefined CDMA chip code is referred to as a "resource". Multiple resources are associated with a single mobile link subband. Each mobile link subband may only support a limited number of resources. As noted above, mobile link subbands are processed in groups, referred to as mobile link channels for simplification. Each beam includes at least one mobile link channel. Additional mobile link channels may be assigned to a single beam when the mobile terminal demand within the beam exceeds the number of resources available within a single mobile link channel (e.g., when a beam passes over a major metropolitan area). By way of example only, four mobile link channels may be available for use with a single beam. FIGS. 2 and 3 illustrate exemplary feeder link and mobile link channel definitions which may be utilized in connection with a satellite based telecommunications system. FIG. 2 illustrates the feeder link frequency spectrum 50 (e.g., 300 MHz) associated with a single ground station, which may be divided into a plurality of fixed bandwidth subsections (each of which is referred to as a "channel"). The feeder link frequency spectrum may be divided into a number of channels equaling the number of beams defined by the antenna array so that each ground station can service traffic in any beam. In the example of FIG. 2, 61 beams are utilized and thus the feeder frequency spectrum is divided into 61 channels of equal bandwidth (e.g., 4.9 MHz in width for a feeder link of 300 MHz in width).

FIGS. 3A and 3B illustrate exemplary channel bandwidths which may be utilized for each mobile link beam. In the example of FIG. 3A, the bandwidth available for use within a single beam may be divided into three equal bandwidth mobile link channels, with each channel nominally assigned to one of a plurality of ground stations. Optionally, as in the example of FIG. 3B the mobile link beam bandwidth may equal 16.5 MHz which may be divided into two subbands of 4.9 MHz in bandwidth and two subbands of 3.35 MHz in bandwidth. The configuration of FIG. 3B enables full use of the allocated mobile link band in some beams, when the allocated feeder link bandwidth is not sufficient to support the full mobile link band in all beams simultaneously.

Optionally, each satellite may support multiple feeder links simultaneously and allow multiple earth stations to simultaneously share the bandwidth available to each beam. In the example of FIG. 1, first and second earth or ground stations 14 and 16 communicate over first and second feeder links 20 and 22 with satellite 10. Each of feeder links 20 and 22 may include a feeder bandwidth 50 divided as illustrated in FIG. 2 among a plurality of beams. The mobile link beam bandwidth 60 (FIG. 3B) associated with a single beam 26 may be divided into mobile link channels 62–65. Optionally, each mobile link channel 62–65 may be mapped or assigned to a different feeder link depending upon the number of earth stations in view of, and feeder links supportable by, the satellite 10. If it is assumed that satellite 10 supports three feeder links, then mobile link channel 63 may be assigned to a first feeder link 20 with earth station 14, mobile link channel 64 may be assigned to a second feeder link 22 with earth station 16 and mobile link channels 62 and 65 may be assigned to a third feeder link 23 with earth station 15.

According to the example of FIGS. 1–3, earth station 14 may transmit RF signals over a desired subband of first channel 52 of feeder link 20. The satellite 10 translates in frequency the RF signals received within channel 52 of feeder link 20 to the frequency of the corresponding subband of mobile link channel 63. The satellite transmits the RF signals over mobile link channel 63 in the beam covering the mobile terminal 12. Satellite 10 similarly receives RF signals within a designated subband of a designated channel of the second feeder link 22 from the second earth station 16 and translates same in frequency to a corresponding subband of mobile link channel 64 for retransmission over mobile link 18 to mobile terminal 12.

FIG. 4A illustrates an exemplary mapping scheme correlating a feeder link to multiple beams. A portion of the frequency spectrum of the feeder link is illustrated by reference 80. The feeder link is divided into a plurality of feeder channels 82 numbered #1–#6. FIG. 4A further illustrates frequency spectra for mobile link beams 84–86 corresponding to beams N−1, N and N+1 within a satellites coverage area. Mobile link beams 84–86 are divided into mobile link channels 88–90, respectively. In the example of FIG. 4A, each mobile link beam is divided into four mobile link channels of equal bandwidth. The bandwidth of each feeder link channel 82 equals the bandwidth of each mobile link channel 88–90. The feeder and mobile link channels 82 and 88–90 are occupied by modulated carriers at center frequencies 92 and 94–96, respectively, distributed evenly along the channel.

For purposes of illustration only it may be assumed that feeder link channel #1 is mapped or assigned to mobile link channel #4 within mobile link beam 84, while feeder link channel #6 is assigned to mobile link channel #1 of mobile link beam 86. Feeder link channels #2–#5 are assigned to mobile link channels #1–#4 of mobile link beam 85. According to this example, when an earth station transmits an RF signal at a carrier center frequency 92 within feeder link channel #1, the satellite translates and re-broadcasts the RF signal at a corresponding carrier center frequency 94 within mobile link channel #4 of mobile link 84 supported by beam N−1. Mobile terminals which are located within beam N−1 and are assigned to the broadcast carrier center frequency 94 within mobile link channel #4 of the mobile link 84 receive and process the RF signal. The mobile terminal thereafter transmits RF signals (upon a carrier center frequency assigned thereto by the earth station) within a separate mobile link channel (not shown) of beam N−1. The satellite detects the RF signal transmitted by the mobile terminal and translates the RF signal to a carrier center frequency within a separate feeder link channel (not shown) and transmits same to the earth station.

It should be understood that the mobile uplinks and downlinks do not necessarily share the same band allocations. Nor do feeder uplinks and feeder downlinks share the same bands. For example, the mobile uplinks and downlinks may be transmitted in the L-band and S-band, respectively. For example, the feeder uplinks and downlinks may be transmitted at 30 GHz and 20 GHz, respectively.

In the example of FIG. 4A, the feeder and mobile link channels 82 and 84–86 have equal bandwidths. However, these bandwidths may differ depending upon the frequency spectrum allocated to the feeder link and to the mobile links and depending upon the number of beams generated by the satellite.

FIG. 4B illustrates an alternative feeder link and mobile link channel configuration in which the feeder link channels all have equal bandwidths, while the mobile link channels have different bandwidths. For instance, mobile link channels #2 and #3 in beams #70–72 have the same bandwidth as all feederlink channels #20–25, while mobile link channels #1 and #4 in beams #70–72 all have bandwidths less than the feeder link channels #20–25. In this example, feeder link channels #20, #22, #23 and #25 may be mapped or assigned to mobile link channel #3 of beam 70, channels #2 and #3 of beam 71 and channel #2 of beam 72, respectively. Feeder link channel #21 may be mapped or assigned to mobile link channel #4 in beam 70 as well as mobile link channel #1 in beam 71. Feeder link channel #24 may be mapped or assigned to mobile link channel #1 in beam 72 as well as mobile channel #4 in beam 71. Dashed lines 74 and 75 illustrate overlap regions of the feeder link channels #21 and #24 which may be assigned to two beams.

Optionally, the subbands of feeder link channels #21 and #24 within the overlap regions 74 and 75 may be assigned to only one of the two potential beams at any given time. For instance, the overlap region 74 of feeder link channel #21 may be assigned to either mobile link channel #4 in beam 70 or mobile link channel #1 in beam 72 but not both simultaneously. Similarly, the overlap region 75 of feeder link channel #24 may be assigned to either mobile link channel #1 in beam 72 or mobile link channel #4 in beam 71.

Alternatively, the overlap regions 74 and 75 within the feeder link channels #21 and #24 may be assigned simultaneously to both associated beams provided the earth station maintains synchronization in timing and frequency for RF signals to and from mobile terminals within beams N−1, N and N+1. If the system maintains synchronization in timing and frequency between all mobile terminals, then a mobile terminal in beam N and a mobile terminal in beam N−1 may be assigned to a subband with a common center frequency in the overlap region 74. In this example, interference between these terminals is avoided because each mobile terminal would be assigned a unique CDMA chip code from an orthogonal set. In this alternative configuration, beams N and N−1 would each transmit all RF signals associated with the subbands in the overlap region 74 of channel #21.

FIG. 5 illustrates a block diagram of a channelizer unit which has been proposed by Robert Parish, and the inventors of the present invention. The invention illustrated in FIG. 5 is assigned to the assignee of the present invention.

The forward channelizer unit 100 includes a forward expander 102 and a plurality of forward sub-channelizer units (one of which is illustrated within the block denoted by reference numeral 104). The forward expander 102 may receive up to three forward feeder link signals upon lines 106–108. For instance, lines 106 and 107 may receive the feeder link signals 20 and 22 from first and second earth stations 14 and 16, respectively (FIG. 1). The feeder link signals are processed within signal processing sections 110–112 and passed to a summer 114 which combines the feeder link signals. The composite feeder link signal is passed along line 116 to a power divider 118 which supplies identical copies of the composite feeder link signal to multiple output leads 120. Each of the output leads 120 is connected to a separate forward sub-channelizer unit 104. Each forward sub-channelizer unit 104 is similar in structure and thus only one is illustrated.

Each forward sub-channelizer 104 includes a forward up-converter module 122 and a forward matrix switch module 124. The forward up-converter module 122 converts the composite feeder link signal to a plurality of mobile link signals, each of which corresponds to a mobile link channel. The forward up-converter 122 includes a plurality of power dividers 126 and 128 that divide each incoming composite feeder link signal into a plurality of identical divider output signals, each of which contains all of the RF signals in the composite feeder link signal. The divider output signals are supplied upon leads 130 to an equal plurality of up-converters 132. Optionally, the divider output signals may each pass through filters (not shown) in the up-converters to pass only a desired channel from the composite feeder link signals. Each up-converter 132 is driven by a corresponding unique synthesizer 134. Each synthesizer 134 generates a local oscillator signal which is located at a predefined unique frequency. Optionally, the local oscillator frequency may be selectable from a subset of predefined frequencies, under control of a ground station. Each up-converter 132 translates or "tunes" the frequency of the RF signals from the incoming feeder link intermediate frequency upward by a predetermined amount dependent upon the frequency of the synthesizer 134 to produce a retuned processing channel signal upon lead 136. By way of example only, the feeder link intermediate frequency signals on lines 106–108 may have frequencies in the UHF range, while the processing channel signals output by the up-converters 132 may have frequencies in the L-band or S-band ranges.

The forward matrix switch module 124 includes a plurality of summers 138–141 and 156–159 and eight-way switches 153–155. The summers 138–141 and 156–159 each receive processing channel signals upon at least one dedicated traffic channel (denoted by references 142–149). The first and second eight-way switches 153 and 154 draw inputs from the upper summing group corresponding to summer 126, while eight-way switch 155 receives an input from the lower summing group corresponding to summer 128. The eight-way switches 153–155 perform switching operations to redirect the processing channel signals received upon lines 150–152 to one of the summers. This switching function provides back-up capability in the event of a failure of an upconverter or synthesizer associated with one of the dedicated traffic channels, or alternatively applies an additional increment of feeder link bandwidth to a beam whose traffic demand exceeds the bandwidth capability of the dedicated traffic channel. By way of example only, the first eight-way switch 153 may switch the processing channel signal received upon line 150 to the first summer 138 (corresponding to beam 1). The eight-way switches 153–155 may be controlled remotely by a ground station which instructs the channelizer to switch based upon the external demands placed upon each beam.

For instance, beam #1 may pass over a major metropolitan area and require more resources, while beam #4 may pass over a rural area. Accordingly, the ground station may instruct the channelizer to switch eight-way switches 153–155 to connect each of leads 150–152 to the first summer 138 corresponding to beam #1. The forward sub-channelizer unit 104 provides a "frequency selectable conversion process" which steers or directs the feeder link frequency spectrum to a desired segment of the bandwidth associated with the mobile links.

Optionally, filters may be relocated from the input section of up-converters 132 to the outputs of summers 138. The band pass filters will permit only desired channels of the overall bandwidth to be passed to each corresponding beam. For this approach to offer flexible bandwidth assignments to beams, a plurality of filters of differing bandwidths can be provisioned at the outputs of each of the summers 183, along with a switch network.

However, the forward channelizer in FIG. 5 includes some undesirable characteristics. First, the summing function implemented by summer 114, FIG. 5, has the effect of limiting the total bandwidth of the system to that of a single feeder link, and requiring continuous coordination among the ground stations to resolve conflicts and avoid interference. It would be preferable to preserve the full bandwidth available from the sum of all feeder links and avoid the need for continuous real-time conflict resolution among the ground stations. Secondly, the channelizer 100 requires a separate commandable synthesizer for each up-converter and each processing channel in order to perform retuning, thereby unduly complicating the overall system. Moreover, many such synthesizers must respond to tuning commands, which the ground stations must send either in real-time or in stored schedules for later execution by the payload channelizer to perform retuning during ground station handovers and beam handovers.

Yet another undesirable characteristic of the channelizer of FIG. 5 is that no connection exists between sub-channelizer units 104. Thus, each sub-channelizer unit 104 is only able to map feederlink channels onto a limited number of mobile link channels within an equally limited number of beams. For example, if traffic demand peaks simultaneously in two or more of beams #1–7 serviced by the sub-channelizer 104 shown in FIG. 5, the capacity of channels on leads 142–152 may be exceeded. At the same time, beams other than #1–7 may be under less demand and the corresponding second subchannelizer may have unused channels. However, those unused channels cannot relieve a shortage in beams #1–7 because there is no connection between sub-channelizer units. Additionally, the channelizer 100 requires that the bandwidth requirements of each beam be predicted in order that the ground station may set the eight-way switches 153–155 accordingly. However, bandwidth requirements continuously change as satellites orbit the earth. As satellites orbit, the coverage area associated with a given satellite continuously moves and thus will pass over metropolitan and rural areas having different resource demands. It is difficult to predict when resource demands will change. Imperfect predictions lead to wasted resources and lost revenue for the system operator.

Moreover, as the satellites orbit, fixed and mobile terminals pass between beams. When a terminal passes between beams, a beam hand over must take place to maintain the terminal's connection with the system. The handover process requires coordination between ground stations, terminals and satellites to avoid dropping a user. To effect a handover, the switching configuration within the forward matrix switch module 124 must be changed and the synthesizer frequency selection must be retuned. Switching and retuning unduly complicate the hand over process. When in high demand areas, switching and retuning unduly increase the risk of dropping users while a resource is switched between beams. The risk of being dropped may exist each time a satellite effects a handover while passing over a given area. Satellites follow the same ground track multiple times per day and thus, mobile terminals in the same regions on the earth will undergo handovers at the same time each day. Thus, a user located within an area associated with a high risk of dropouts may experience the same problem at the same time each day.

A need remains for an improved channelizer for use with a satellite based telecommunications system. It is an object of the present invention to meet this need.

BRIEF SUMMARY OF THE INVENTION

It is an object of the present invention to provide a telecommunications satellite channelizer which maps RF signals between a plurality of feeder links and a large number of contiguous beams while avoiding interference between adjacent beams.

It is a corollary object of the present invention to provide a telecommunications satellite channelizer which enables the system to perform ground station handovers, (e.g., to shift communications traffic from one ground station to another) without changing the assignments of user terminals to mobile link beams.

It is a corollary object of the present invention to provide a telecommunications satellite channelizer which enables a ground station to perform terminal handovers, (e.g., to reassign terminals from one beam to another beam, when moving between beams) to a new mobile link frequency band allocated to the beam to which the terminal moves.

It is a further object of the present invention to provide a telecommunications satellite channelizer which supports ground station and terminal handovers without the need for channel filter switching and converter retuning.

It is a further corollary object of the present invention to provide a telecommunications satellite channelizer which supports ground station and terminal handovers entirely transparent to the satellite payload without requiring on-board state coordination or switching delays.

It is yet a further corollary object of the present invention to provide a telecommunications satellite channelizer which supports ground station and terminal handovers at a convenient pace, rather than forcing handovers to occur with timing dictated by the need to reroute scarce payload resources.

It is a further object of the present invention to provide a telecommunications satellite channelizer which avoids blocking of processing channels within the channelizer, the entire bandwidth of all feeder links being independently accessible and completely mappable to all beams at all times.

It is another object of the present invention to provide a telecommunications satellite channelizer which provides feeder link connectivity to the entire allocated mobile link band at all times within all beams, while a predefined percentage of the total traffic is routed through each of a plurality of feeder links.

It is another object of the present invention to provide a telecommunications satellite channelizer which minimizes the internal complexity by utilizing a set of frequency plans which enable each band pass filter design to be used multiple times.

It is another object of the present invention to provide a telecommunications satellite channelizer which utilizes a set of frequency plans that minimize the number of local oscillators needed to effect conversion from an intermediate channelizer processing frequency to the mobile terminal transmission frequency.

It is another object of the present invention to provide a telecommunications satellite channelizer which utilizes a set of frequency plans that eliminates the need for commandable (tunable) frequency synthesizers.

These and other objects are achieved by providing a telecommunications satellite channelizer for mapping RF signals between feeder links and mobile links based on predefined frequency plans. The mobile link beams define a coverage area of a satellite. The satellite maintains feeder links with ground stations and mobile links with mobile terminals within the coverage area. Each feeder link and each mobile link beam comprises a plurality of subbands carrying RF signals between the ground stations and satellites and between the satellites and mobile terminals, respectively. The subbands within each mobile link beam are grouped to form mobile link channels. The subbands within each feeder link are grouped to form feeder link channels. When implemented as a forward channelizer, the channelizer includes a plurality of feeder input leads carrying feeder link signals from the ground stations. Each feeder link signal contains a plurality of feeder link channels. The forward channelizer further includes a dedicated feeder link distribution network connected to each feeder input lead for mapping RF signals in that feeder link signal onto a plurality of distribution leads as replica feeder signals. Each replica feeder signal on a distribution lead contains all the RF signals in the original feeder link signal.

The channelizer further includes a plurality of similar filter banks connected to the distribution leads. A separate filter bank is dedicated to each feeder link distribution network. Each filter bank includes a plurality of band pass filters, each of which passes RF signals in a subset of subbands associated with a single feeder channel to map a mobile link channel and a feeder link channel onto one another based on one of the predefined frequency plans. The channelizer further includes a plurality of signal summing networks, each of which combines a subset of filtered signals from all feeders into a composite mobile channel. One summing network is dedicated to each mobile link beam, which provides continuous access by all ground stations to that mobile link beam.

Frequency converters are provided at the output of each summing network to translate the composite mobile link signal from the intermediate frequency band to the allocated transmit frequency band of the mobile link. External to the channelizer, RF signals in each mobile link channel are passed to a beam forming network to be transmitted over a corresponding mobile link beam.

The frequency plans may be defined such that feeder channels from a single feeder link are mapped to different relative channel locations in adjacent beams, in order to allow a single feeder channel to serve a large number of contiguous beams, while avoiding interference between adjacent beams. The frequency plans may further be defined such that corresponding feeder channels (having a common frequency range) from multiple feeder links are mapped to different mobile channels in a common frequency range from multiple frequency plans. This feeder-to-mobile channel frequency plan mapping scheme enables the same types of filters to be used for corresponding channels from each feeder link. The frequency plans may further be defined such that all of the mobile link channels in any frequency plan maintain the same frequency relation to one another as the frequency relation of the associated feeder channels relative to one another, regardless of the feeder link from which the feeder channel originates.

The frequency plans may further be defined such that all of the feeder channels in a predetermined frequency range for a number of feeder links are mapped into an equal number of beams. The number of feeder channels in the predetermined frequency range from a single feeder link may equal the number of available channels in a beam. By maintaining these feeder to beam channel relations, the frequency plans enable a single, fixed local oscillator to be used in the channelizer for multiple beams (e.g., one beam for each frequency plan).

According to a preferred embodiment of the present invention, a plurality of feeder leads are provided for simultaneously receiving feeder links from a corresponding number of ground stations. The feeder link distribution network includes a plurality of power dividers (the number of which equals the number of feeder links) for separately dividing corresponding feeder links into the plurality of replica feeder signals. Multiple sets of filter banks are provided, with each set having one filter bank associated with one feeder link. The multiple filter banks, in conjunction with a specific signal summer and frequency converter produce a mobile link beam having a channel configuration associated with the corresponding frequency plan.

In an alternative embodiment, a channelizer is provided having multiple ground station handover switches for selectively connecting different combinations of feeder input leads to desired power dividers within the distribution network. The ground station handover switching section enables multiple feeder leads to be connected to a single power divider e.g., during transition when one ground station is entering, and another is exiting the satellite field of view. The ground station handover switching section also enables a single feeder lead to be connected to multiple power dividers, permitting a single ground station to access additional bandwidth in every beam up to the entire mobile link bandwidth allocation for the system.

Another alternative embodiment is proposed in which a plurality of interrupt switches are provided, each interrupt switch being associated with a single band pass filter in the filter banks. The interrupt switches enable individual filters to be selectively connected and disconnected in order to connect and disconnect mapping relations between individual feeder channels and mobile channels, e.g., to avoid wasting transmitter power in certain beams when a single feeder lead is connected to multiple power dividers.

DETAILED DESCRIPTION OF THE INVENTION

It is understood that the present invention is equally useful in a forward channelizer mapping RF signals from an earth station to mobile terminals and in a return channelizer mapping RF signals from mobile terminals to an earth station. However, for simplification of explanation, the preferred embodiments are only discussed in connection with a forward channelizer.

Figure 1:
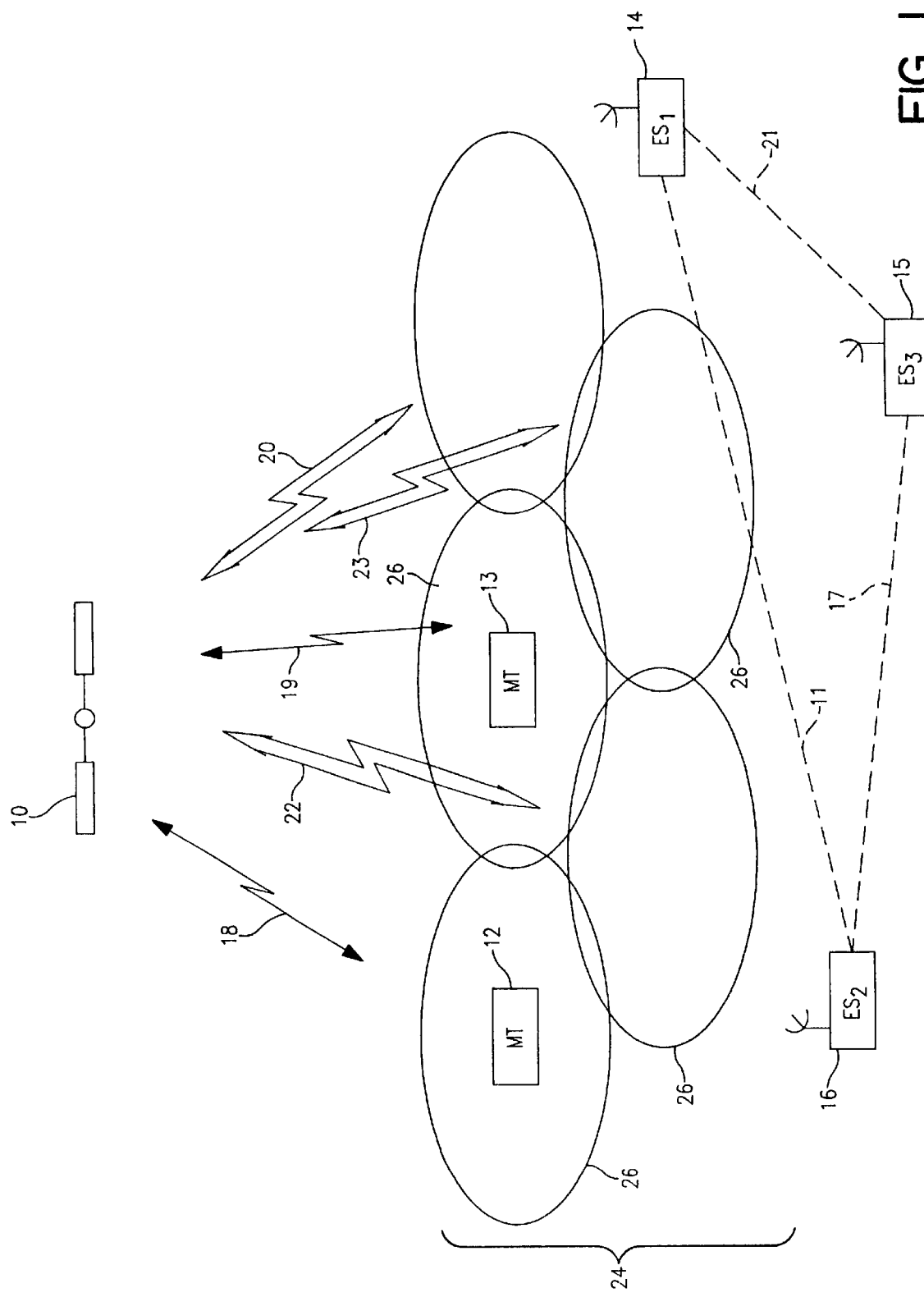
FIG. 1 illustrates a subsection of a satellite-based telecommunications system.
Figure 2:
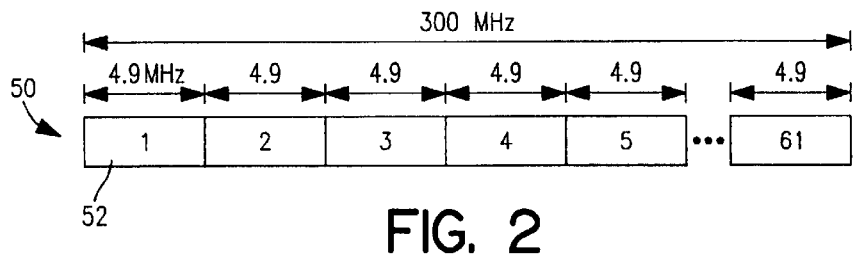
FIG. 2 illustrates an exemplary feeder link channel definition which may be utilized in connection with a preferred embodiment of the present invention.
Figure 3A:
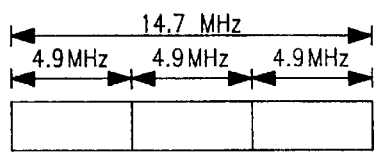
FIG. 3A illustrates an exemplary mobile link channel definition based on equal bandwidth feeder link channels.
Figure 3B:
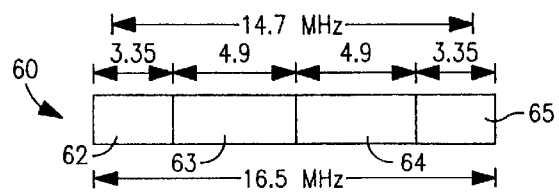
FIG. 3B illustrates an alternative mobile link channel definition which may be utilized in connection with a preferred embodiment of the present invention.
Figure 4B:
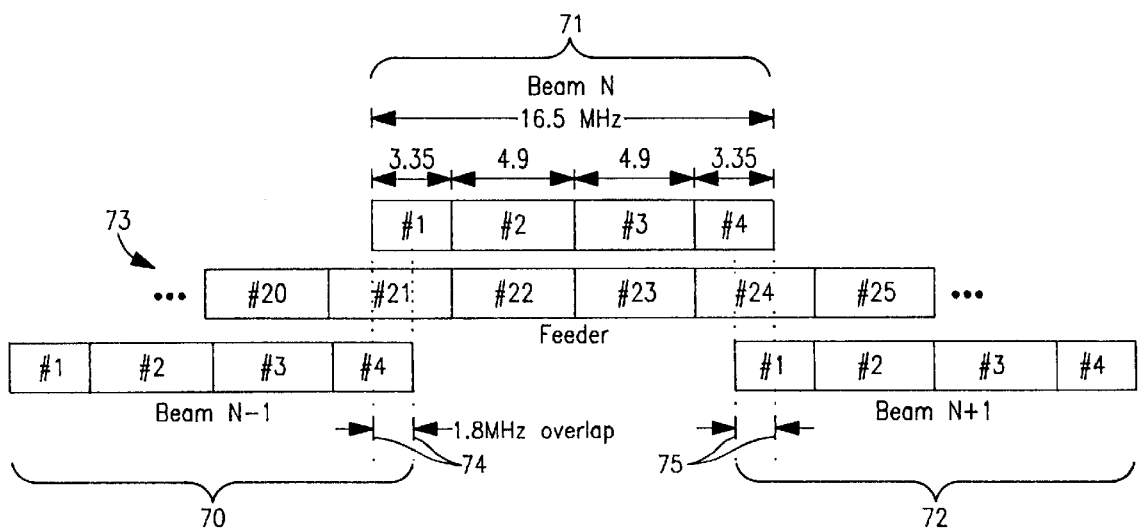
FIG. 4B illustrates an alternative mapping scheme correlating a feeder link to multiple beams which may be utilized in connection with the preferred embodiment of the present invention.
Figure 4A:
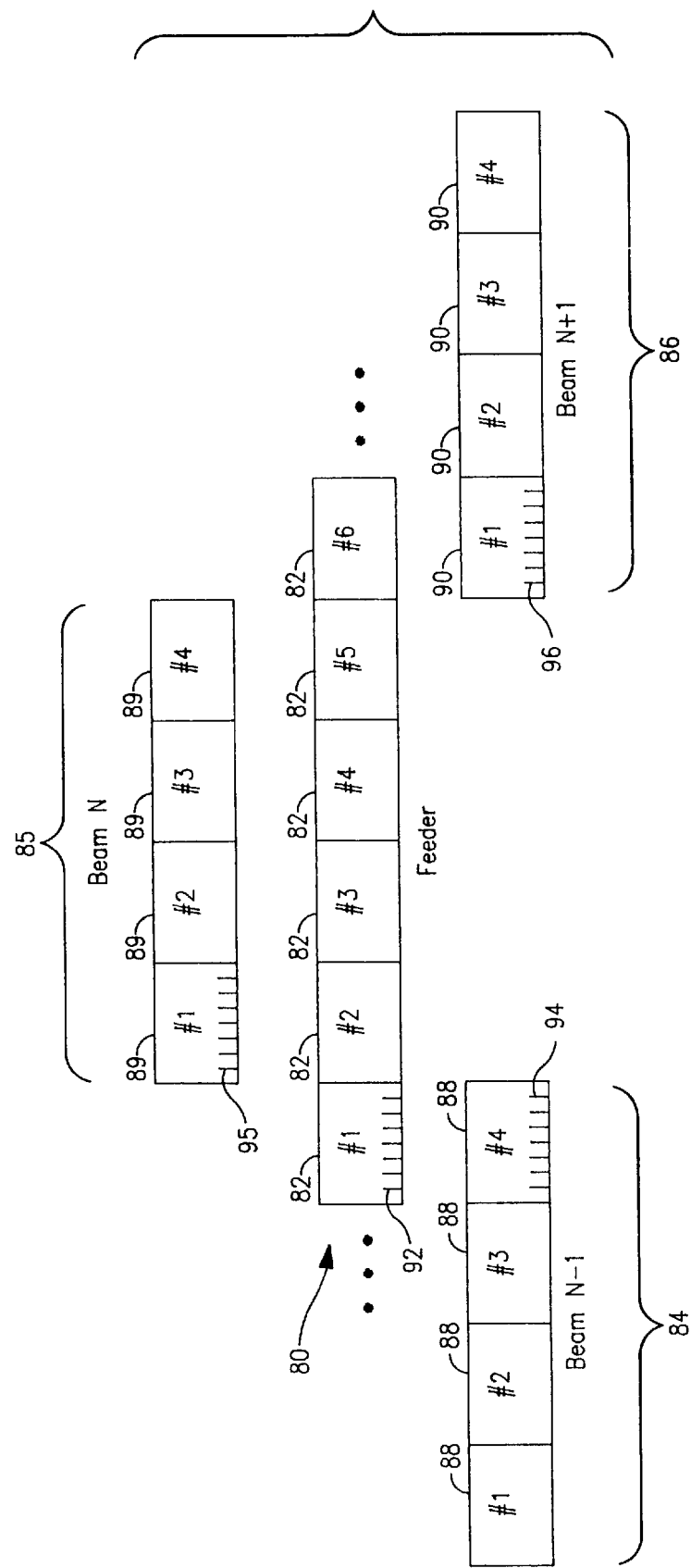
FIG. 4A illustrates an exemplary mapping scheme correlating a subsection of a feeder link to multiple beams.
Figure 5:
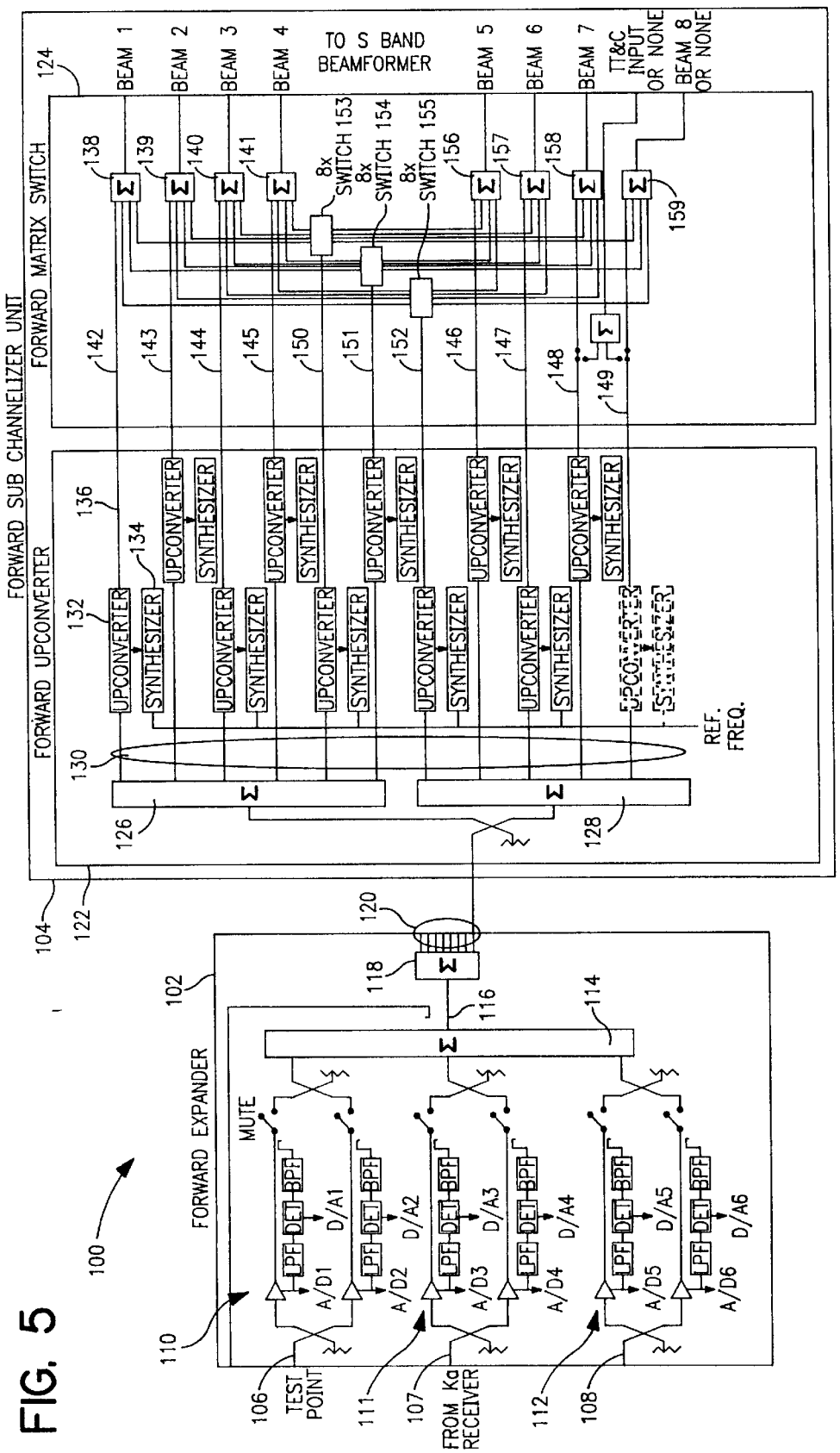
FIG. 5 illustrates a block diagram of a channelizer unit.
Figure 6:
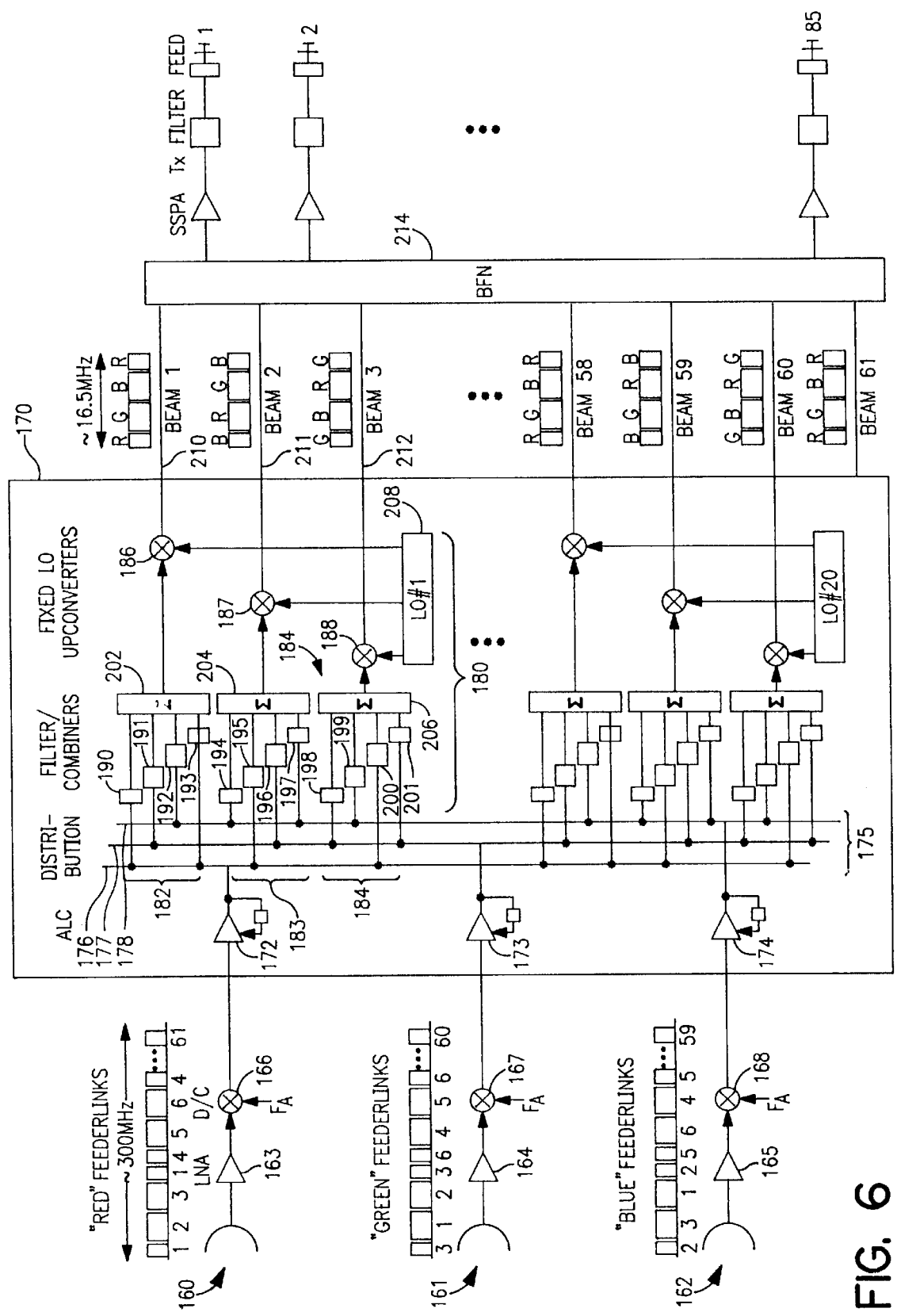
FIG. 6 illustrates a block diagram of a channelizer configuration according to a preferred embodiment of the present invention.

FIG. 6 illustrates a block diagram of a channelizer configuration according to a preferred embodiment of the present invention. Within the channelizer of FIG. 6, three feeder links 160–162 from three separate ground stations may be received. For purposes of illustration, the feeder links have been designated as red, green and blue. The feeder link signals are passed through low noise amplifiers 163–165 and to down converters 166–168. Optionally, the feeder link signals may be transmitted in the K-band frequency range. The downconverters 166–168 may reduce the frequency of the feeder link signals to intermediate processing frequencies. The downconverted feeder link signals are passed to automatic gain controllers 172–174 within the channelizer 170.

The automatic gain controllers 172–174 adjust the amplitudes of the incoming feeder link signals based on pilot or reference tones embedded within each feeder link signal. The gain adjusted, down-converted feeder link signals are then passed to a power distribution network 175 which maps each feeder uplink signal from one input lead onto a plurality of distribution leads. In a return channelizer, the network 175 includes combiners which combine a plurality of incoming RF signals from the distribution leads onto a single output lead as the feeder downlink signal. In a forward channelizer, the network 175 includes at least one power divider 176–178 for each incoming feeder link signal. The power dividers 176–178 split the corresponding incoming feeder link signals into a plurality of output signals of equal amplitude. The RF signal content of the output signals of each power divider are identical to the RF signal input to the power divider. Each power divider 176–178 may include gain elements to adjust the gain upon each distribution lead to a desired level following the dividing operation. By way of example only, each power divider 176–178 may split the corresponding incoming feeder link signals approximately 80 times.

Power divider 176 may divide the red feeder link signal, power divider 177 may divide the green feeder link signal and power divider 178 may divide the blue feeder link signal. The channelizer 170 includes a plurality of processing subsystems identical to processing subsystem 180. A subset of the distribution leads from the red power divider 176 is supplied to the first processing subsystem 180. Similarly, the green and blue power dividers 177 and 178 supply separate and distinct subsets of the distribution leads therefrom to the first processing subsystem 180. The remaining output signals from the red, green and blue power dividers 176–178 are supplied to additional processing subsystems (not shown). If it is assumed that each power divider 176–178 divides a corresponding feeder link signal among distribution leads, and that four distribution leads from each power divider are connected to each processing subsystem, then the channelizer 170 may include 20 processing subsystems.

The processing subsystem 180 receives and processes a plurality of output signals from the power dividers 176–178, based on predetermined frequency plans, to map feeder channels onto corresponding mobile link channels in associated beams. In the example of FIG. 6, the processing subsystem 180 maps feeder channels from three feeder links onto beam #1, beam #2 and beam #3 according to three frequency plans. The frequency plans are explained below in more detail. Optionally, all feeders may have continuous access to all beams. The processing subsystem 180 includes multiple channel multiplexers 182–184. The multiplexers 182–184 include a plurality of band pass filters 190–201, summing elements 202–206 and corresponding up-converters 186–188. Each band pass filter 190–201 passes a desired channel (e.g., set of subbands) of the feeder link signals received from power dividers 176–178. The channels passed by filters 190–193 are combined in summer 202, the channels passed by filters 194–197 are combined in summer 204 and the channels passed by filters 198–201 are combined in summer 206. The combined sets of channels are passed to the up-converters 186–188 which translate the frequencies of the incoming signals by an amount determined by fixed local oscillator 208. The up-converters 186–188 output corresponding mobile link channels to beam #1, beam #2 and beam #3, respectively. The frequency plans of the mobile link beams output from up-converters 186–188 are determined by the power dividers 176–178, the band pass filters 190–201, and their interconnections to summers 202–206, as explained below in more detail.

The mobile link beam signals are supplied upon lines 210–212 to a beam forming network 214 which produces output beams for transmission to the mobile terminals. By way of example only, the beam forming network may be configured as set forth in co-pending application Ser. Nos. 08/629,860 and 08/636,366, filed Apr. 9, 1996 and Apr. 23, 1996, respectively. The '860 and '366 applications are assigned to the Assignee of the present application and expressly incorporated herein by reference in their entireties.

The frequency plan utilized in connection with the present invention may resemble that set forth in co-pending application Ser. No. 08/741,244, entitled "Orthogonal Code Division Multiple Access Waveform Format For Use In Satellite Based Cellular Telecommunications", filed Oct. 30, 1996 now U.S. Pat. No. 6,222,828, by John E. Ohlson and Donald R. Martin, said application being expressly incorporated herein in its entirety by reference.

By way of example only, the preferred embodiment may be utilized in connection with a frequency plan in which the forward and return feeder links are in the K-band frequency range (e.g., the forward link is between 19.3 and 19.6 GHz, while the return link is between 29.1 and 29.4 GHz). The forward mobile link may be in the S-band frequency range (e.g., 2483.5 to 2500.0 MHz), while the return mobile link may be in the L-band frequency range (e.g., 1610.0 to 1626.5 MHz). The forward and return mobile links may be divided into approximately 38 subbands, each of which is 2.040 MHz in width and separated by approximately 0.408 MHz spacing. Optionally, the feeder link may accommodate 122 subbands, each of which is 2.040 MHz in width and separated with 2.448 MHz spacing.

Figure 7:
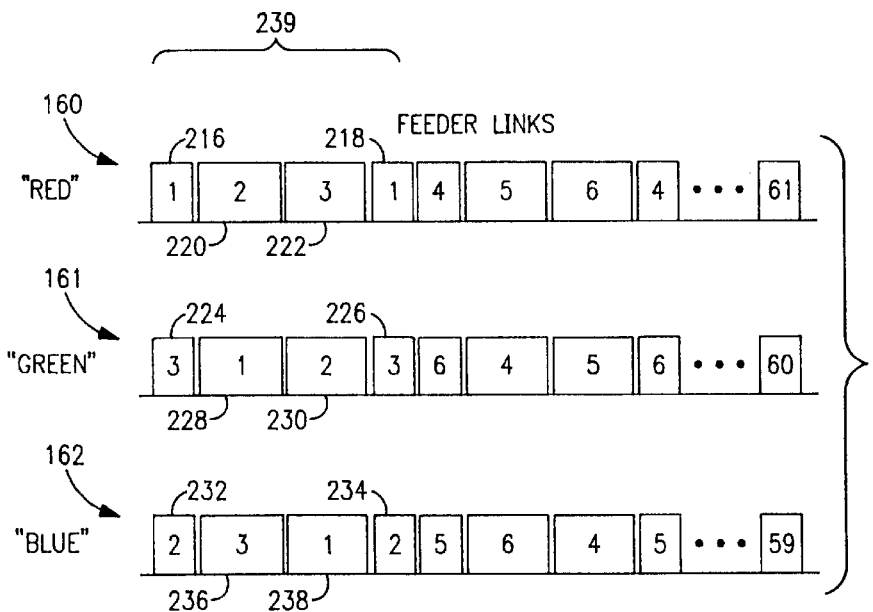
FIG. 7 illustrates an exemplary channel assignment for three feeder links.

Next, an exemplary frequency plan is explained in connection with FIGS. 7–9. FIG. 7 illustrates an exemplary channel assignment for the red, green and blue feeder links 160–162. Each channel within each of feeder links 160–162 is assigned a number identifying the beam to which the feeder channel is to be mapped. In the red feeder link 160, feeder channels 216 and 218 are associated with beam #1, while feeder channels 220 and 222 are associated with beams #2 and #3, respectively. In the green feeder link 161, feeder channels 224 and 226 are associated with beam #3, while feeder channels 228 and 230 are associated with beams #1 and #2, respectively. In blue feeder link 162, feeder channels 232 and 234 are associated with beam #2, while feeder channels 236 and 238 are associated with beams #3 and #1, respectively. Optionally, the feeder channels within a single feeder link need not be of equal bandwidth. For instance, channels 216 and 218 may have equal bandwidth which is narrower than the bandwidths of channels 220 and 222. The channel bandwidth is predetermined to maximize the use of available mobile link bandwidth.

Figure 8:
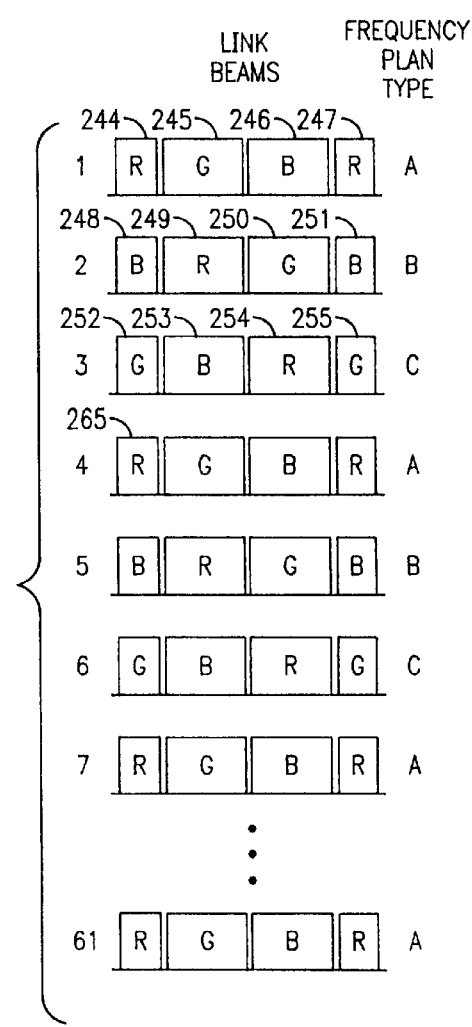
FIG. 8 illustrates exemplary frequency plans for mobile link beams that may be utilized in connection with the preferred embodiment of the present invention.

Turning to FIG. 8, exemplary frequency plans for mobile link beams are illustrated. Each type of frequency plan is assigned a letter. As shown in FIG. 8, frequency plan types are assigned to mobile link beams such that no two adjacent beams use the same frequency plan type. This is done to minimize system self-interference. Frequency plan A includes first and fourth mobile link channels 244 and 247 associated with the red feeder link 160, a second mobile link channel 245 associated with the green feeder link 161 and a third mobile link channel 246 associated with the blue feeder link 162. In frequency plan B, the first and fourth mobile link channels 248 and 251 are associated with the blue feeder link 162, while the second and third mobile link channels 249 and 250 are associated with the red and green feeder links 160 and 161, respectively. In frequency plan C, the first and fourth mobile link channels 252 and 255 are associated with the green feeder link 161, while the second and third mobile link channels 253 and 254 are associated with the blue and red feeder links 162 and 160, respectively. It is understood that the number of frequency plans and the channel assignments within each frequency plan may also vary from those of the preferred embodiment.

Optionally, the frequency plans may be defined such that feeder channels from multiple feeder links, but having a common frequency range, are mapped to mobile channels of a common frequency range from multiple frequency plans. For instance, feeder channels 216, 232 and 224 have a common frequency range and are mapped to mobile link channels 244, 248 and 252 in frequency plans A, B and C, respectively. This feeder to frequency plan mapping scheme enables the same type of filter to be used for corresponding channels from all feeder links.

Optionally, the frequency plans may be defined such that all of the mobile link channels in any frequency plan maintain the same relation, in frequency, to one another as the relation, in frequency, of the associated feeder channels relative to one another, regardless of the feeder link from which the feeder channel originates. Stated another way, each frequency plan may ensure that the first and second mobile link channels are mapped from adjacent feeder channels from one or more of the feeder links, for instance, mobile link channels 248–251 in plan B are mapped from adjacent feeder channels 232, 220, 230 and 234. By maintaining this frequency relation, the preferred embodiment enables a single fixed local oscillator to be used with each beam.

Optionally, the frequency plans may be defined such that feeder channels from a single feeder link are mapped to different channel locations in adjacent beams. For instance, according to frequency plans A–C, red feeder channels 216 and 218 are mapped into mobile channels 244 and 247, and red feeder channels 220 and 222 are mapped to mobile channels 249 and 254. Each of mobile channels 244, 249, 254 and 247 are at different locations (i.e., frequency ranges) in different beams, thereby allowing a single feeder to serve a large contiguous region of beams, while avoiding interference between adjacent beams. For instance, beams 260 and 263 (FIG. 9) may use the same frequency plan, but are separated from one another by beams 261 and 262, thereby avoiding interference between RF signals transmitted in the first channel 244 of beam 260 and in the first channel 244 of beam 263.

Optionally, the frequency plans may be defined such that all of the feeder channels in a predetermined frequency range for a number of feeder links are mapped into a number of beams equal to the number of feeders. For instance, all of the feeder channels 216–238 in the frequency range 239 for three feeder links 160–162 are mapped into an equal number of beams (i.e., three). This common frequency mapping scheme from feeders to beams allows a single local oscillation signal to be used multiple times (i.e., three times).

Optionally, the number of feeder channels in the predetermined frequency range from a single feeder link may equal the number of available channels in a beam. For instance, the predetermined frequency range in the embodiment of FIGS. 7 and 8 has a width of four channels (e.g., 216, 218, 220 and 222) since each beam supports up to four mobile channels (e.g., channels 244–247).

Figure 9:
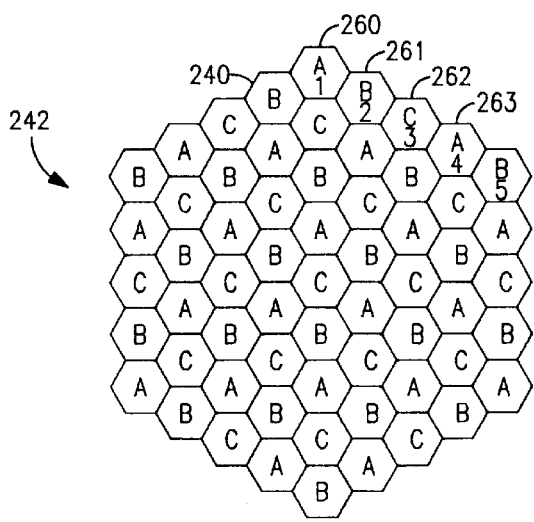
FIG. 9 illustrates an exemplary frequency plan distribution among beams forming a coverage area of a single satellite.

FIG. 9 illustrates an exemplary frequency plan distribution among the beams 240 forming a coverage area 242. Optionally, no two adjacent beams utilize the same frequency plan. It is understood that the present invention is not limited to the frequency plan illustrated in FIG. 9, nor is the present invention limited to any given number of feeder links and beams, nor is the present invention limited to the particular mapping of feeder channels and mobile channels illustrated in FIGS. 7 and 8.

During a beam handover operation, as when a mobile terminal passes from beam 260 (FIG. 9) to beam 261, the mobile terminal is instructed to adjust its transceiver to communicate upon a different mobile link channel served by the same feeder link. For instance, while in beam 260, the mobile terminal may utilize a subband and CDMA chip code from mobile channel 244 in order to communicate with a ground station through the red feeder link 160 (FIG. 7). When the mobile terminal passes to beam 261, the ground station may instruct the mobile terminal to adjust its transceiver to communicate over a subband and with a CDMA chip code assigned to mobile link channel 249. Thus, a handover may be carried out without performing any switching or re-tuning within the channelizer. This handover operation is entirely transparent to the channelizer and requires no state coordination or switching delays within the channelizer. The handover may proceed as soon as the mobile terminal is ready, rather than being forced to occur at a time dictated by a switching and re-tuning operation within the channelizer.

Optionally, beam handovers can be accomplished without performing any switching or re-tuning in either the channelizer or the terminal itself, through coordinated re-routing of traffic from one ground station to another via the wideband terrestrial network. By switching traffic between the feeder links associated with separate earth stations, it is possible to maintain the same transmit and receive frequencies in the mobile terminal across the entire beam handover transition, eliminating the possibility of link interruptions due to switching or tuning transients in either the channelizer of the terminal. For example, when a terminal being served by the red feeder link passes from beam 260 to beam 261, the system re-routes the communications signal from the red earth station to the blue earth station. The frequency assignment to the terminal switches from mobile link channel 244 in beam 260 to the identical frequency location within mobile link channel 248 in beam 261. Resynchronization and other necessary adjustments are accomplished by the blue earth station in conjunction with the red earth station, rather than by the terminal or the channelizer. As above, this handover operation is entirely transparent to the channelizer and requires no state coordination or switching delays within the channelizer.

As is clear from FIGS. 7 and 8, the frequency plan and configuration of the channelizer of FIG. 6 avoid blockage between feeder link channels and mobile link channels. In the example of FIGS. 6–9, all of the feeder link channels are mapped to unique mobile link channels distributed among the available beams.

Returning to FIG. 6, the band pass filters 190–201 are designed to provide the frequency plans of FIG. 8 for beams #1–3. Channel multiplexer 182 is configured according to frequency plan A since channel multiplexer 182 is associated with beam #1. Band pass filters 190 and 193 may be connected to the red power divider 176 and configured to only pass channels 216 and 218, respectively, from the red feeder link 160. Band pass filters 191 and 192 may be connected to the green and blue power dividers 177 and 178, respectively, and configured to pass feeder link channels 228 and 238, respectively. Summer 202 combines and passes channels 216, 228, 238 and 218 to the up-converter 186. The up-converter 186 translates the frequencies of the IF signals within channels 216, 228, 238 and 218 to the S-band frequency range, while maintaining the same frequency relation between subbands in channels 216, 228, 238 and 218.

Referring to channel multiplexer 183, according to frequency plan B, band pass filters 194 and 197 are connected to the blue power divider 178 and configured to pass channels 232 and 234. Band pass filters 195 and 196 are connected to the red and green power dividers 176 and 177, respectively, and configured to pass channels 220 and 230, respectively. The summer 204 combines and passes channels 232, 220, 230 and 234 to the up-converter 187 which translates these channels to a desired S-band frequency range to be transmitted over beam #2. In channel multiplexer 184 and according to frequency plan C, filters 198 and 201 are connected to the green power divider 177 and configured to pass channels 224 and 226. Band pass filters 199 and 200 are connected to the blue and red power dividers 178 and 176, respectively, and configured to pass channels 236 and 222, respectively. Summer 206 combines channels 224, 226, 236 and 222 and passes same to up-converter 188 for translation to the S-band frequency range to be transmitted over beam #3.

The band pass filters within the additional processing modules (not shown) are connected to associated power dividers and configured in the manner explained above to continuously reproduce the frequency plans A, B and C for beams 4–61 (FIG. 8). A unique LO frequency is required for each reproduction.

The embodiment of FIG. 6 simplifies the overall filter design by enabling the same filter design to be used once with each feeder link. In particular, filters 190, 194 and 198 may be of similar design to pass the same frequency subbands (associated with the first channel in each feeder link) while being connected to different power dividers 176–178. Similarly, band pass filters 191, 195 and 199 may be constructed of similar design to pass the same frequency subbands, while being connected to different power dividers 176–178. A single local oscillator 208 may be utilized for all of the filter banks 182–184 in the processing subsystem 180, to drive three separate up-converters 186–188. By way of example only, the signals passed from summers 202, 204 and 206 may be at an intermediate frequency range, such as around 800 MHz, while the up-converters 186–188 translate the RF signals from the intermediate frequency range to a mobile link frequency range such as around 2 GHz.

Optionally, the band pass filters 190–201 may represent surface acoustic wave filters and the like. Optionally, the local oscillators 208 within each of the subsystems 180 may interconnect with a common frequency reference to maintain coherency between local oscillators. Optionally, the frequency reference may be omitted. The output frequencies of the local oscillator 208 may be fixed, and need not be adjusted, since the relationship between the feeder link frequencies, intermediate frequencies and mobile link frequencies remains fixed throughout processing.

Figure 10:
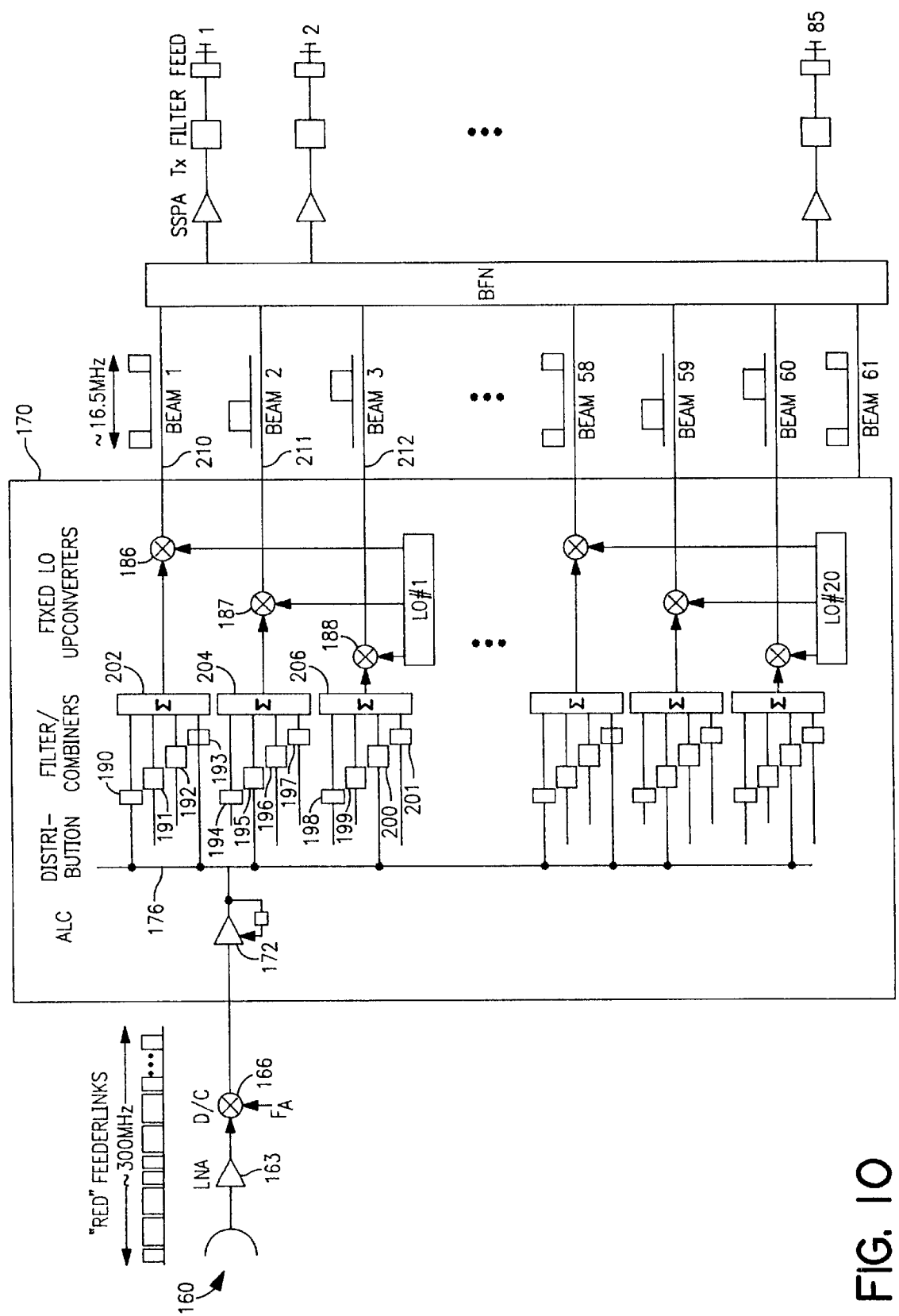
FIG. 10 illustrates the channelizer of the preferred embodiment of FIG. 6 when in operation with a single feeder link.

FIG. 10 illustrates the channelizer 170 of the preferred embodiment in operation while only a single ground station is within the coverage area of the satellite. As shown in FIG. 10, only the red feeder link 160 is operative. In this situation, the red power divider 176 continues to divide and supply the feeder link signal to band pass filters 190, 193, 195 and 200. The corresponding channels within the red feeder link 160 are passed through summers 202, 204 and 206 and through up-converters 186–188 to the output lines 210–212. FIG. 10 illustrates that every beam will be usable within the frequency plan of the preferred embodiment even when just a single ground station is within the field of view of the satellite.

Figure 11:
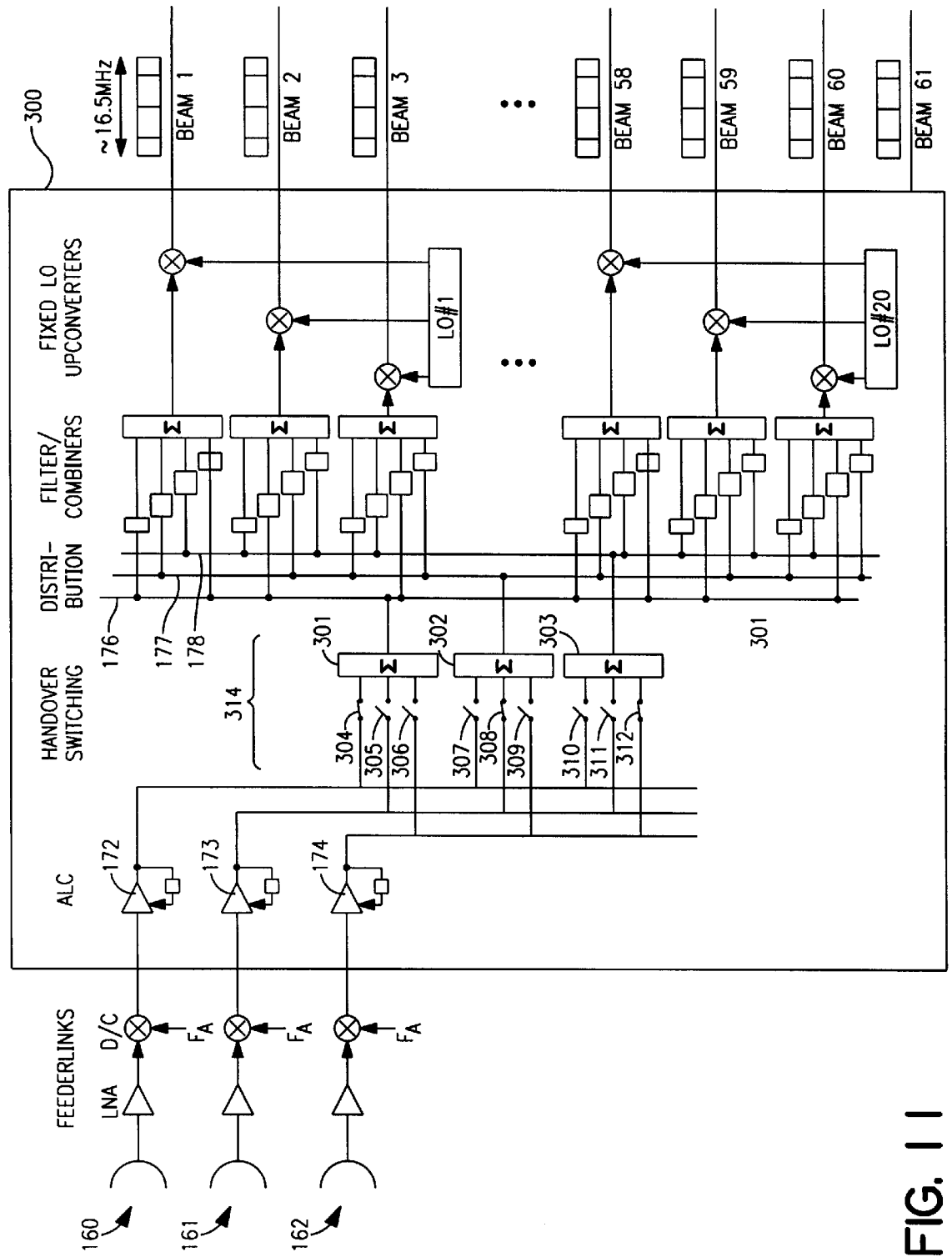
FIG. 11 illustrates an alternative embodiment of a channelizer according to the present invention.

FIG. 11 illustrates an alternative embodiment in which like reference numerals correspond to elements explained above in connection with the embodiment of FIG. 6. In FIG. 11, the channelizer 300 has been modified to include a handover switching section 314 located between the automatic gain controllers 172–174 and the power dividers 176–178. The handover switching section 314 includes a plurality of summers 301–303, each of which is attached to corresponding automatic gain controllers 172–174 to receive corresponding feeder link signals 160–162. Each summer 301–303 includes three input leads containing switches 304–312 for selectively connecting each summer to one or more of the feeder link signals 160–162. As illustrated in FIG. 11, switch 304 is closed to connect summer 301 with the red feeder link signal 160, while switch 308 is closed to connect summer 302 with the green feeder link signal 161. Switch 312 is closed to connected summer 303 with the blue feeder link signal 162. The outputs of the summers 301–303 are connected to the red, green and blue power dividers 176–178, respectively. The alternative embodiment of FIG. 11 allows the channelizer to connect and disconnect varying combinations of ground stations to effect a ground station handover. For instance, if it is desirable to disconnect the red feeder link signal 160 and reroute the associated terminals to the green feeder link signal 161, switch 304 may be opened and switch 305 closed.

Ground station handovers are necessary since, throughout a satellite's orbit, ground stations enter and leave the field of view of the satellite. As a ground station leaves the field of view of a satellite, it is necessary to transition its service to a different ground station in order to maintain communication with mobile terminals without interruption. It may be desirable to interconnect the ground stations through a terrestrial network to afford simultaneous access by ground stations to one another's communications traffic. Thus, another ground station in the field of view of the satellite may pick up the traffic dropped by the ground station leaving the satellite's field of view.

Figure 12:
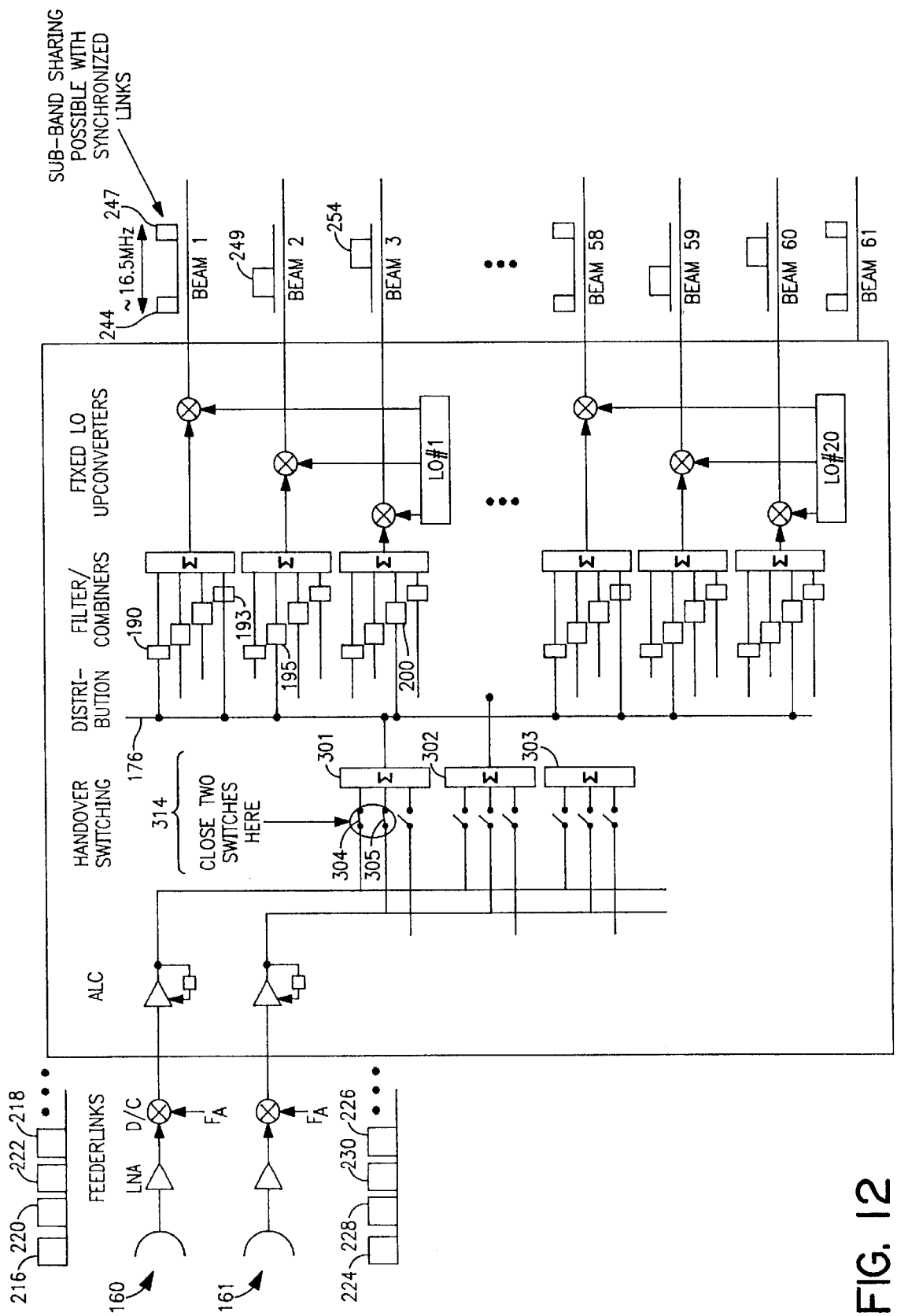
FIG. 12 illustrates an alternative embodiment of a channelizer in operation with two feeder links sharing a single filter bank according to the present invention.

FIG. 12 illustrates an alternative embodiment in which only two ground stations are within the field of view of the satellite. In addition, in the embodiment of FIG. 12, it is desirable to share particular subbands in a single mobile link channel between the ground stations in order to perform ground station handovers without interrupting the mobile links. Subband sharing is possible when all ground stations maintain synchronization in timing and frequency with those terminals sharing specific subbands. As shown in FIG. 12, the handover switching section 314 is set such that switches 304 and 305 are closed to connect summer 301 with red and green incoming feeder links 160 and 161. The remaining switches are open and thus summers 302 and 303 do not receive input signals. Summer 301 delivers both feeder links 160 and 161 to a single power divider 176. The outputs of the power divider 176 are supplied through filters 190, 193, 195 and 200 to beams #1, #2 and #3. Within beam #1, the first mobile link channel 244 carries RF signals from feeder channels 216 and 224. The fourth channel 247 in beam #1 carries RF signals from channels 218 and 226 in feeder links 160 and 161. Within beams #2 and #3, mobile link channels 249 and 254 each carry RF signals from feeder channels 220 and 228 and channels 222 and 230, respectively.

Figure 13:
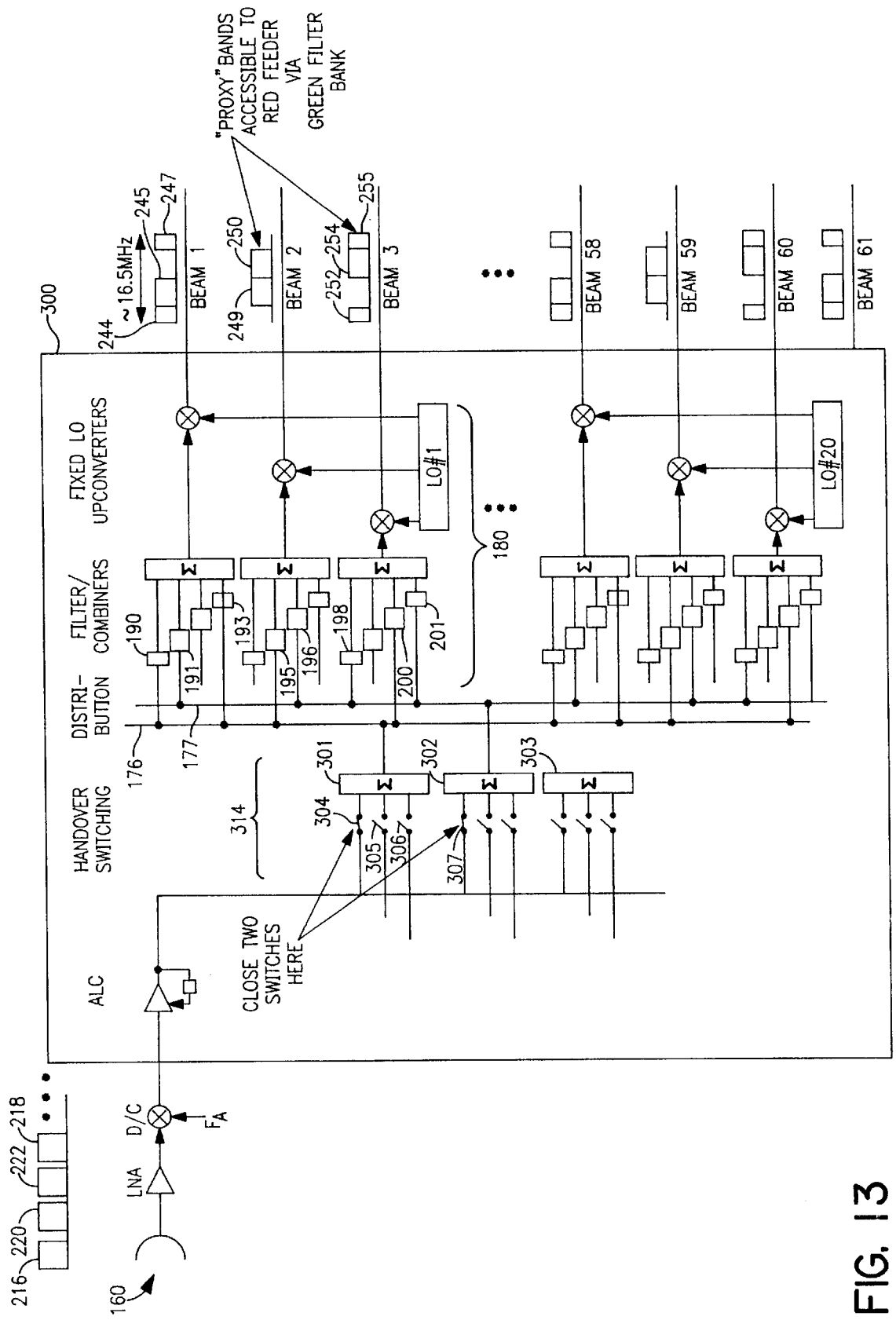
FIG. 13 illustrates an alternative embodiment of a channelizer having a handover switching section according to the present invention, in operation with a single feeder link.

FIG. 13 illustrates an alternative embodiment in which the handover switching section 314 is configured to attach a single feeder link 160 to multiple power dividers 176 and 177. This configuration provides more bandwidth to beams under single ground station operating conditions than would be available with the hard-wired embodiments of FIGS. 6 and 10, where each ALC 172–174 is connected to one, and only one, of the power dividers 176–178. This feature is desirable when the communication traffic in a beam requires more bandwidth than a single ground station could access using the channelizer embodiments of FIGS. 6 and 10. For instance, switches 304 and 307 may be closed while the rest of the switches remain open. Closed switches 304 and 307 deliver the feeder link 160 to the first and second summers 301 and 302 which in turn supply the feeder link 160 to the first and second power dividers 176 and 177. The outputs of power dividers 176 and 177 supply the feeder link 160 to band pass filters 190, 191, 193, 195, 196, 198, 200 and 201 within the processing subsystem 180. Channelizer 300 supplies the IF signals from feeder channels 216 (FIG. 7), 220 and 218 to beam #1 within mobile link channels 244, 245 and 247. Channelizer 300 supplies the IF signals from feeder channels 220 and 222 to beam #2 within mobile link channels 249 and 250. Channelizer 300 supplies RF signals from feeder link channels 216, 222 and 218 to mobile link channels 252, 254 and 255, respectively.

The embodiment of FIG. 13 enables the system to utilize any number of the mobile link channels, up to the entire complement allocated to each beam, with only a single feeder link operating.

Figure 14:
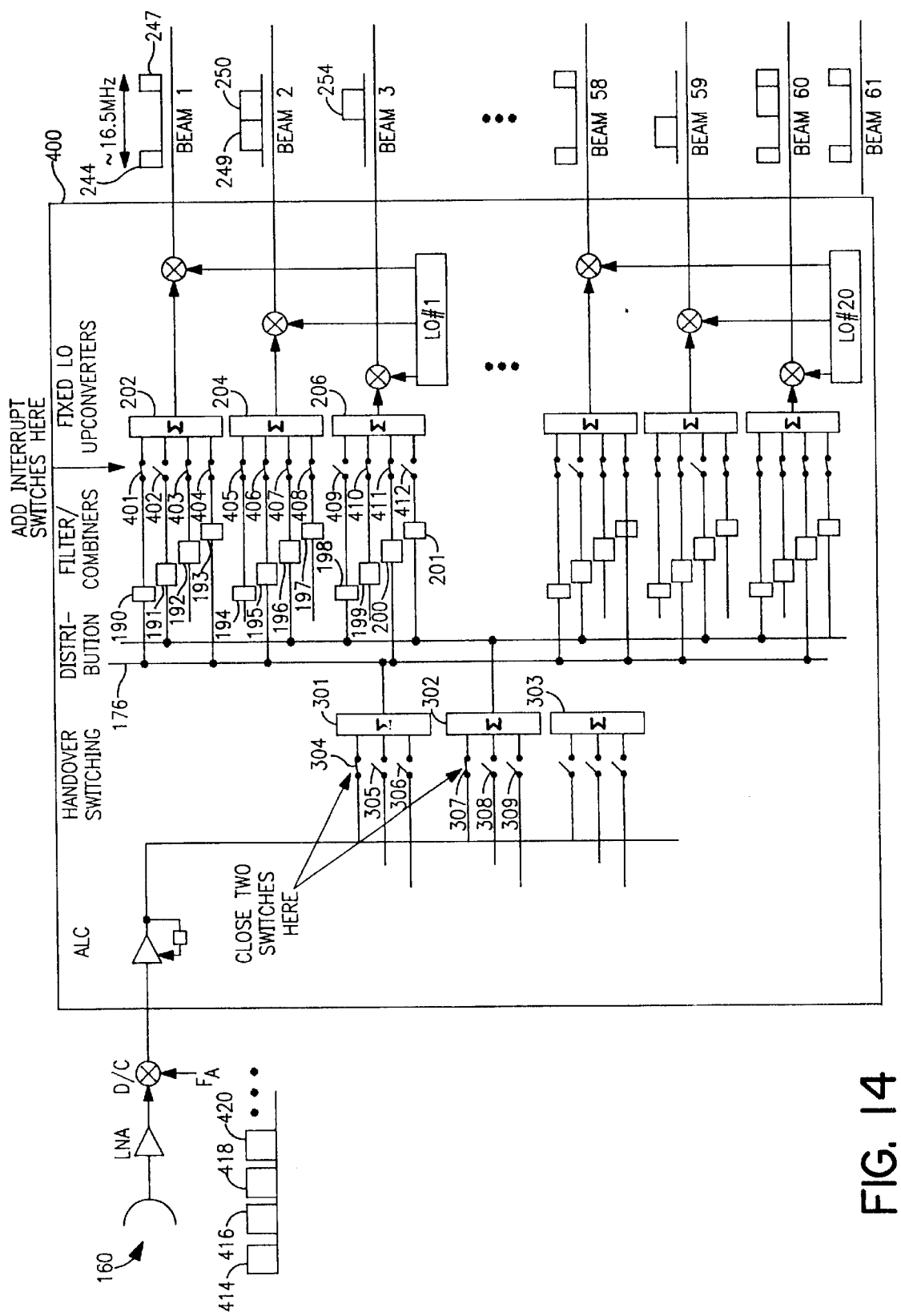
FIG. 14 illustrates an alternative embodiment of a channelizer having interrupt switches and a handover switching section, according to the present invention, in operation with a single feeder link.

FIG. 14 illustrates an alternative embodiment in which the channelizer 400 has been further modified to add a series of interrupt switches 401–412 between the band pass filters 190–201 and summers 202, 204 and 206.

The interrupt switches 401–412 afford an additional level of selectivity to enable the channelizer 400 to connect selectively the signal feeder link 160 with desired mobile link channels in each beam. This configuration permits additional bandwidth to be made available to any beams in the single ground station operating case, without forcing other beams to carry the additional capacity or to transmit redundant signals. For instance, switch 402 is open thereby removing mobile link channel 245 (FIG. 13) from the available mobile channels in beam #1. Similarly, interrupt switches 409 and 412 are opened to remove mobile link channels 252 and 255 from the mobile link channels available for use in beam #3 with the signal feeder link 160. This additional level of selectivity enables the channelizer 400 to prevent unnecessary power usage such as transmitting over unneeded mobile link channels (e.g., channels 245, 252 and 255).

While particular elements, embodiments and applications of the present invention have been shown and described, it will be understood, of course, that the invention is not limited thereto since modifications may be made by those skilled in the art, particularly in light of the foregoing teachings. For example, all of the operational advantages of the present invention could be realized by implementing the channelizer architecture herein disclosed, with digital rather than analog/RF technology. It is therefore contemplated by the appended claims to cover such modifications as incorporate those features which come within the spirit and scope of the invention.

What is claimed is:

1. A telecommunications satellite channelizer for mapping RF signals between feeder links and mobile link beams based on predefined frequency plans, the mobile link beams defining a coverage area of a satellite, each feeder link and mobile link beam comprising a plurality of feeder frequency subbands and mobile frequency subbands, respectively, carrying RF signals between ground stations and the satellite and between the satellite and mobile terminals, respectively, wherein mobile frequency subbands are grouped to form mobile link channels and wherein feeder frequency subbands are grouped to form feeder link channels, said channelizer comprising:

at least one feeder lead, each feeder lead carrying a feeder link signal associated with a ground station, said feeder link signal having a frequency spectrum divided into a plurality of said feeder link channels;

a feeder link distribution network connected to said at least one feeder lead mapping RF signals separately between each feeder link signal and a corresponding plurality of processing channel leads;

at least one channel multiplexer mapping a mobile link channel and a feeder link channel onto one another based on one of a predefined set of frequency plans, said multiplexer mapping at least first and second feeder link channels from first and second feed links, onto separate corresponding first and second mobile link channels, respectively, in a single mobile link beam, wherein said first and second feeder link channels include separate, non-overlapping feeder frequency subbands, and wherein said first and second mobile link channels include separate, non-overlapping mobile frequency subbands, said channel multiplexer including a set of band pass filters connected to a processing channel lead, each filter passing RF signals for a subset of subbands associated with a single feeder link channel, said multiplexer mapping mobile and feeder link channels on to one another based on predefined frequency plans that enable ground stations to perform mobile link beam handovers without a need for at least one of switching, retuning and resynchronizing the telecommunications satellite; and converters translating RF signals between frequency spectrums of subbands of feeder link channels and mobile link channels.

2. A telecommunications satellite channelizer according to claim 1, further comprising first and second channel multiplexers passing first and second feeder link channels based on first and second predefined frequency plans.

3. A telecommunications satellite channelizer according to claim 1, wherein each channel multiplexer includes at least four band pass filters, first and second band pass filters passing corresponding feeder link channels to a first mobile link beam, third and fourth band pass filters passing corresponding feeder link channels to second and third mobile link beams, respectively.

4. A telecommunications satellite channelizer according to claim 1, further comprising multiple channel multiplexers, each channel multiplexer including multiple band pass filters cooperating to pass from multiple feeder links consecutive feeder link channels in a predetermined order based on a corresponding predefined frequency plan.

5. A telecommunications satellite channelizer according to claim 1, wherein each channel multiplexer includes four band pass filters to pass four feeder link channels which are uniquely mapped to four corresponding mobile link channels in one beam.

6. A telecommunications satellite channelizer according to claim 1, further comprising a plurality of summers, each summer being connected to associated band pass filters for combining a subset of feeder link channels to form a subset of RF signals associated with passed feeder link channels, a corresponding converter translating said subset of RF signals to said frequency spectrum of corresponding mobile link channels.

7. A telecommunications satellite channelizer, according to claim 1, further comprising fixed local oscillators driving said converters, wherein a single local oscillator drives a group of converters associated with a group of beams.

8. A telecommunications satellite channelizer according to claim 1, further comprising an automatic level control adjusting the amplitude of said feeder link signal based on a pilot tone in said feeder link signal.

9. A telecommunications satellite channelizer according to claim 1, wherein said converters further comprise a down converter translating a frequency of said feeder link signal from a K-band frequency spectrum to an intermediate frequency spectrum upstream of said feeder link distribution network, and an up converter translating RF signals at said intermediate frequency spectrum to an L-band frequency spectrum.

10. A telecommunications satellite channelizer according to claim 1, further comprising:

at least first and second feeder input leads receiving first and second feeder link signals from first and second ground stations;

at least first and second power dividers, connected to said first and second feeder input leads, respectively, distributing said first and second feeder link signals among first and second pluralities of processing channel leads, wherein at least one channel multiplexer includes first and second band pass filters passing a first feeder link channel from said first feeder link signal and a second feeder link channel from said second feeder link signal.

11. A telecommunications satellite channelizer according to claim 1, further comprising:
at least two feeder input leads receiving two feeder link signals, said feeder link distribution network including at least two power dividers separately supplying said at least two feeder link signals to at least two band pass filters in one channel multiplexer, each of said at least two band pass filters passing a feeder link channel from a corresponding feeder link signal based on a frequency plan of an associated mobile link beam.

12. A telecommunications satellite channelizer according to claim 1, further comprising:
at least two feeder input leads receiving at least two feeder link signals;
a summer combining said at least two feeder link signals to form a combined feeder link signal supplied to said feeder link distribution network; and
switches for selectively connecting and disconnecting said feeder link signals from said summer.

13. A telecommunications satellite channelizer, according to claim 1, further comprising:
summers for combining outputs of said bandpass filters; and
a plurality of switches for selectively connecting and disconnecting band pass filters and outputs to said summers.

14. A telecommunications satellite channelizer according to claim 1, wherein said feeder link distribution network and channel multiplexer cooperate such that feeder channels in a first common frequency range from multiple feeder links are mapped to mobile channels in a second common frequency range in multiple mobile link beams.

15. A telecommunications satellite channelizer according to claim 1, wherein said channel multiplexer maps first and second mobile link channels from adjacent feeder channels to a single beam.

16. A telecommunications satellite channelizer according to claim 1, wherein said channel multiplexer maps feeder channels from a single feeder link to different mobile channel locations in adjacent beams.

17. A telecommunications satellite channelizer according to claim 1, wherein said multiple channel multiplexers map all feeder channels in a predetermined frequency range from a number of feeder links into a number of beams, said number of feeder channels in said predetermined frequency range from a single feeder link equalling said number of available channels in a beam.

18. A telecommunications satellite channelizer according to claim 1, wherein said set of frequency plans includes more than one frequency plan and fewer frequency plans than the number of mobile link beams.

19. A telecommunications satellite channelizer according to claim 1, wherein a number of feeder link channels in one feeder link equals the number of mobile link beams.

20. A telecommunications satellite channelizer according to claim 1, wherein a mobile link beam includes at least two mobile link channels mapped from at least two associated feeder link channels in one feeder link.

21. A telecommunications satellite channelizer according to claim 1, wherein a frequency range of said feeder links differs from a frequency range of said mobile link beams.

22. A method of mapping RF signals, in a telecommunications satellite channelizer, between ground stations and mobile terminals, said method comprising the steps of:
transmitting and receiving RF signals in feeder links to and from ground stations, each feeder link having a frequency spectrum divided into feeder channels, each feeder channel in a feeder link having a different frequency range;
transmitting and receiving RF signals in mobile link beams to and from mobile terminals, each mobile link beam having a frequency spectrum divided into multiple mobile link channels, each mobile link channel in a mobile link beam having a different frequency range;
defining at least one frequency plan, identifying a one-to-one correlation between feeder channels and mobile link channels;
assigning a frequency plan to each mobile link beam; and
defining at least one frequency plan such that at least two mobile link channels in a single mobile link beam are mapped to a single feeder link.

23. A method according to claim 22, further comprising the steps of:
transmitting and receiving RF signals over multiple feeder links to and from multiple ground stations; and
based on a first frequency plan mapping at least one channel each from first and second feeder links onto first and second channels in a first mobile link beam.

24. A method according to claim 22, wherein the frequency plans are defined such that the number of feeder channels in a feeder link equals the number of mobile link beams.

25. A method according to claim 22, wherein the frequency plans are defined such that first and second feeder channels from first and second feeder links, respectively, are mapped to mobile channels from first and second mobile link beams, respectively, said first and second feeder channels having a common frequency range.

26. A method according to claim 22, wherein the frequency plans are defined such that the mobile link channels maintain the same relation to one another as the relation of associated feeder channels relative to one another regardless of the feeder link from which the feeder channel originated.

27. A method according to claim 22, wherein the frequency plans are defined such that first and second mobile link channels in a single mobile link beam are mapped from adjacent feeder channels in a single feeder link.

28. A method according to claim 22, further comprising the steps of defining different frequency plans for adjacent mobile link beams.

29. A method according to claim 22, further comprising the steps of:
mapping first through fourth mobile link channels of successive frequencies in a first mobile link beam to first through fourth feeder channels of consecutive frequency, said first and fourth feeder channels being from a first feeder link, said second feeder channel being from a second feeder link and said third feeder channel being from a third feeder link.

30. A method according to claim 22, further comprising the steps of:
transmitting and receiving RF signals over at least two feeder links from at least two ground stations; and mapping channels from each of said first and second feeder links separately and independent of one another through the channelizer according to first and second frequency plans.

31. A method according to claim 22, wherein said assigning step assigns a different frequency plan to all adjacent beams.

32. A method according to claim 22, wherein said assigning step includes the step of assigning different frequency plans to adjacent mobile link beams and assigning a common frequency plan to mobile link beams remotely located from one another.

33. A method according to claim 22, further comprising the step of assigning a first frequency range to said feeder links and a second frequency range to said mobile link beams, said first and second frequency ranges differing from one another.

* * * * *